United States Patent
Diab

(10) Patent No.: US 7,409,566 B1
(45) Date of Patent: Aug. 5, 2008

(54) METHODS AND APPARATUS FOR CONTROLLING POWER SUPPLIED TO A REMOTE DEVICE THROUGH A NETWORK CABLE

(75) Inventor: Wael William Diab, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 776 days.

(21) Appl. No.: 10/464,179

(22) Filed: Jun. 18, 2003

(51) Int. Cl.
*G06F 1/28* (2006.01)

(52) U.S. Cl. .................................... 713/310; 455/13.4

(58) Field of Classification Search ......... 713/300–340; 324/537–539; 455/127.1, 298, 343.1, 572, 455/13.4
See application file for complete search history.

(56) References Cited

U.S. PATENT DOCUMENTS

| | | | | |
|---|---|---|---|---|
| 6,098,174 | A | 8/2000 | Baron et al. ................ | 713/300 |
| 6,317,839 | B1 | 11/2001 | Wells ......................... | 713/320 |
| 6,535,983 | B1 * | 3/2003 | McCormack et al. ....... | 713/310 |
| 6,629,248 | B1 | 9/2003 | Stachura et al. ............. | 719/340 |
| 6,674,271 | B2 | 1/2004 | Choo et al. ................. | 323/282 |
| 6,839,215 | B2 * | 1/2005 | Le Creff et al. ............. | 361/119 |
| 6,986,071 | B2 * | 1/2006 | Darshan et al. ............. | 713/330 |
| 7,068,781 | B2 * | 6/2006 | Le Creff et al. ............. | 379/413 |
| 7,155,622 | B2 * | 12/2006 | Mancey et al. .............. | 713/324 |
| 7,162,650 | B2 * | 1/2007 | Ke et al. ..................... | 713/300 |
| 2003/0061522 | A1 * | 3/2003 | Ke et al. ..................... | 713/300 |
| 2003/0194912 | A1 * | 10/2003 | Ferentz ....................... | 439/676 |
| 2004/0073597 | A1 * | 4/2004 | Caveney et al. ............. | 709/200 |
| 2004/0146061 | A1 * | 7/2004 | Bisceglia et al. ........... | 370/419 |
| 2005/0268120 | A1 * | 12/2005 | Schindler et al. ........... | 713/300 |
| 2006/0089230 | A1 * | 4/2006 | Biederman et al. .......... | 477/34 |

* cited by examiner

*Primary Examiner*—Thuan N Du
(74) *Attorney, Agent, or Firm*—BainwoodHuang

(57) ABSTRACT

A detection circuit monitors a hardware-level signal received from a remote device for voltage transitions indicating that the remote device is connected to a network cable. If the detection circuit does not sense voltage transitions in the hardware-level signal, it is presumed that the remote device has been unplugged from the network cable and the detection circuit generates an immediate or delayed control signal to terminate supplying power through the network cable. In one application, the network cable supports communications based on a layered network protocol such as Ethernet and the detection circuit is employed at physical layer associated with the layered network protocol. Based on this topology, power supplied through the network cable can be terminated on the order of milliseconds instead of 1.5 seconds according to conventional methods.

21 Claims, 6 Drawing Sheets

METHODS AND APPARATUS FOR CONTROLLING POWER SUPPLIED TO A REMOTE DEVICE THROUGH A NETWORK CABLE

BACKGROUND OF THE INVENTION

There are a wide variety of data communication standards suitable for carrying data information among network devices. Certain protocols support providing power through network cables to remote devices such as VOIP (Voice Over Internet Protocol) telephones. Thus, in addition to supporting data communications, the network cables also support providing power to remote network devices. Providing power to remote devices through a network cable alleviates the user from having to additionally tether the remote device to a separate power source such as a 115 volt wall outlet.

Protocols developed for the purpose of supplying power to remote devices (for VOIP and other applications) through network cables typically include an initial discovery phase. During the discovery phase, a switch determines whether or not to provide power through the network cable to the remote device. For example, discovery typically includes receiving some form of feedback from the remote device indicating that it is safe to send power over the network cable to power the remote device. After it is deemed appropriate, the switch then powers the remote device through the network cable.

In addition to providing power to remote devices over a network cable, protocols have been developed to terminate power supplied through the network cable when the remote device is unplugged or turned off. In one application, a switch providing power to the remote device monitors a data stream from the remote device at a link layer to identify when a corresponding link with the remote device has been terminated as a result of a being unplugged from the network cable. According to a conventional protocol, even though a remote device has been unplugged from a network cable supplying power, the switch continues to provide power (during a blind window) through the cable for a significant amount of time which in some cases is up to 1.4 seconds. This blind window of supplying power through the network cable power occurs largely because a link down-state machine monitoring the link at a link layer has built-in hystreresis. For example, the link-down state machine does not flag that a link is technically 'down' until a considerable amount of time has passed after a cable has been unplugged from a remote device. Historically, this feature of not immediately depowering a remote device through a network cable has been used to eliminate false linkdowns.

SUMMARY OF THE INVENTION

Unfortunately, there are deficiencies associated with conventional techniques of terminating power supplied through a network cable to power a remote device. For example, the delay time (such as unnecessarily long hysteresis) between detecting an unplugged remote device and terminating power through the cable creates a potentially dangerous condition in which the network cable is still 'alive' with power even though the remote device has been unplugged. In the event that a user plugs the live network cable into another network device that does not expect to receive power over the network cable, the newly connected network device can be damaged.

One type of device typically not requiring power from the switch is a laptop computer having its own battery pack. Thus, if a user completes a call using a VOIP phone powered via the network cable and quickly plugs a still 'live' cable into the laptop computer before the switch terminates power through the network cable, the laptop computer (or associated network interface card of the laptop computer) may be unnecessarily damaged by a duration (up to 1.5 seconds) of power supplied through the live network cable. The mere possibility of causing damage by unplugging the network cable acts a as deterrent to unplugging a network cable and plugging it into another device. Note that there is no visual indication identifying when it is safe to plug the cable into another device after previously using the cable in another application such as a VOIP phone powered through the network cable.

One method of notifying users that a network cable is still live with power is to provide an indicator light such as an LED (Light Emitting Diode) on the cable or connector to indicate when the switch is providing power through the cable. For example, a lighted LED could indicate that power is delivered through the network cable and that it may be unsafe to plug a live network cable into another device. Unfortunately, the integration of an LED into the network cable increases its cost and complexity. Moreover, providing an indicator light in the cable or connector places the burden of determining whether it is safe to plug into another device onto the user instead of the switch actually providing power over the network cable. In most circumstances, users do not want to worry about whether it is safe to plug a cable into a remote network device. Instead, users prefer to be able to a plug network cables into any type of device at any time. In one application, the user is an information technology administrator in a wiring closet away from a personal computer or phone. Thus, viewing an indicator LED integrated in a cable is not possible at the patch panel.

It is an advancement in the art to generate an indication signal identifying that a remote device has been unplugged from the network cable prior to completion of a 'link down' procedure implemented at the switch powering the remote device through a network cable. Accordingly, one aspect of the present invention involves more quickly terminating power supplied through a network cable to a remote device compared to conventional methods. A detection circuit monitors a hardware-level signal (or link energy) received from the remote device. If the detection circuit does not sense voltage transitions in the hardware-level signal, it is presumed that the remote device has been unplugged from the network cable and the detection circuit, in turn, generates an immediate or delayed control signal to terminate supplying power through the network cable. An operation of terminating power can be independent of whether a link continues to exist at a software level. For example, power can be terminated prior to termination of the link by the link-down state machine at the link-layer.

According to one arrangement, the network cable supports communications based on a layered network protocol such as Ethernet and the detection circuit is employed at physical layer associated with the layered network protocol. For example, the detection circuit monitors voltage transitions (at a physical layer of the hardware) received on, e.g., a twisted pair of wires from the remote device. In this arrangement, the detection circuit detects that the remote device has been disconnected from the network cable by failing to sense logical state transitions in the hardware-level signal from the remote device. This technique of monitoring a received signal at the physical layer enables a switch or other device providing power to the remote device to detect when the remote device has been disconnected from the network cable prior to sensing the disconnection at a link layer. Consequently, power through the network cable can be terminated on the order of milliseconds instead of 1.5 seconds according to conventional methods.

In one application, the detection circuit identifies that the remote device has been disconnected from the network cable after sensing that no voltage transitions occur within a predetermined interval of time. For example, detection of voltage transitions resets a timeout counter that otherwise increments and causes a timeout and termination of power trough the network cable. Since the timeout counter must increment to a certain value before a timeout (e.g., a declaration that the remote device has been disconnected) is flagged, transient communication failures (in which there are no voltage transitions for a very short period of time) do not cause termination of power through the network cable.

To increase system flexibility, the predetermined interval of time (or timeout period) can be programmed so that the time between detecting that the remote device has been unplugged from the network cable and terminating power supplied through the network cable varies depending on the application. For example, the predetermined interval of time (or timeout period) can be selected or programmed so that power through the network cable is terminated between, e.g., 1 millisecond and 1 second after detecting no voltage transitions. Typically, the predetermined time interval is short enough so that a user unplugging the network cable from the remote device (such as a VOIP phone) cannot then plug the network cable into another device (such as a laptop computer) prior to termination of power through the network cable. Thus, immediately plugging the network cable into the laptop computer after unplugging it from another device poses no danger to the laptop computer.

In one application, the detection circuit generates a three-state status signal to identify a state of a link established with the remote device. For example, one state of the three-state status signal (such as a continuous logic 0) indicates that a link with the remote device is active at a link layer level. Another state of the three-state status signal (such as a continuous logic 1) indicates that the remote device is disconnected from the network cable and link layer is inactive. Yet another state of the three-state status signal (such as a 1 megahertz square wave) indicates that the remote device is generating voltage transitions on the hardware-level signal and that the remote device is either attempting to establish a new link layer with the remote device or that the switch still has an active link established after a remote device has been unplugged. Use of a three-state status signal reduces a pin count associated with a logic device such as an FPGA (Field Programmable Gate Array) that generates the signal because the three-state status signal combines characteristics of two otherwise separate signals.

In a similar vein, another aspect of the present invention involves initially providing power through a network cable to a remote device that receives communications according to a layered network protocol. A detection circuit is employed at a physical layer associated with the layered network protocol to monitor a hardware-level signal (or link energy) received from the remote device over the network cable. The detection circuit monitors the hardware-level signal and, in response to detecting voltage transitions, generates a control signal that in turn enables a power source to provide power through the network cable.

Another arrangement of the present invention is directed to a computer program product that includes a computer readable medium having instructions stored thereon for controlling power through a network cable to a remote device. The instructions, when carried out by a processor, cause the processor to perform the steps of: (i) communicating with a remote device over a network cable; (ii) monitoring a hardware-level signal received from the remote device over the network cable; (iii) detecting that the remote device has been disconnected from the network cable by failing to sense voltage transitions in the hardware-level signal received from the remote device; and (iv) in response to detecting a condition in which the remote device has been disconnected from the network cable, terminating power supplied through the network cable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Providing continuous power through a network cable for a substantial period of time after it has been unplugged (from a device that is previously powered) can cause damage to expensive electronic equipment. For example, the delay time between detecting an unplugged remote device and terminating power through the cable creates a potentially dangerous condition in which the network cable is still 'alive' with power even though the remote device has been unplugged. In the event that a user plugs the live network cable into another network device that does not expect to receive power through the network cable, the newly connected network device can be damaged.

One aspect of the present invention reduces a time it takes to terminate power delivered through a network cable after a remote device has been unplugged. A detection circuit monitors a hardware-level signal (or link energy) received from the remote device for voltage transitions indicating that the remote device is connected to a network cable. If the detection circuit does not sense voltage transitions in the hardware-level signal within a specified window of time, it is presumed that the remote device has been unplugged from the network cable and the detection circuit generates an immediate or delayed control signal to terminate supplying power to the remote device through the network cable. In one application, communications over the network cable are received according to a DC-balanced protocol such as 4B/5B encoding. This will be discussed later in the specification.

In one application, the network cable supports communications based on a layered network protocol such as Ethernet and the detection circuit is employed at physical layer associated with the layered network protocol. Based on this topology of directly monitoring at the physical layer (rather than at a next higher up link layer associated with the protocol), power supplied through the network cable can be terminated on the (approximate) order of milliseconds instead of 1.5 seconds according to conventional methods.

Although the techniques described herein can be used in networking applications, and particularly to data communications devices that provide power through a network cable to remote device, the techniques are also well-suited for other applications that provide or control power to remote devices or non-power connect/disconnect applications. For example, one embodiment of the invention includes generating a control shutoff signal in response to failing to detect transitions in a communication signal received over a network cable. Such a control signal can then be used to deactivate, e.g., a robot device otherwise operating based on real-time instructions received over the network cable.

Figure 1:
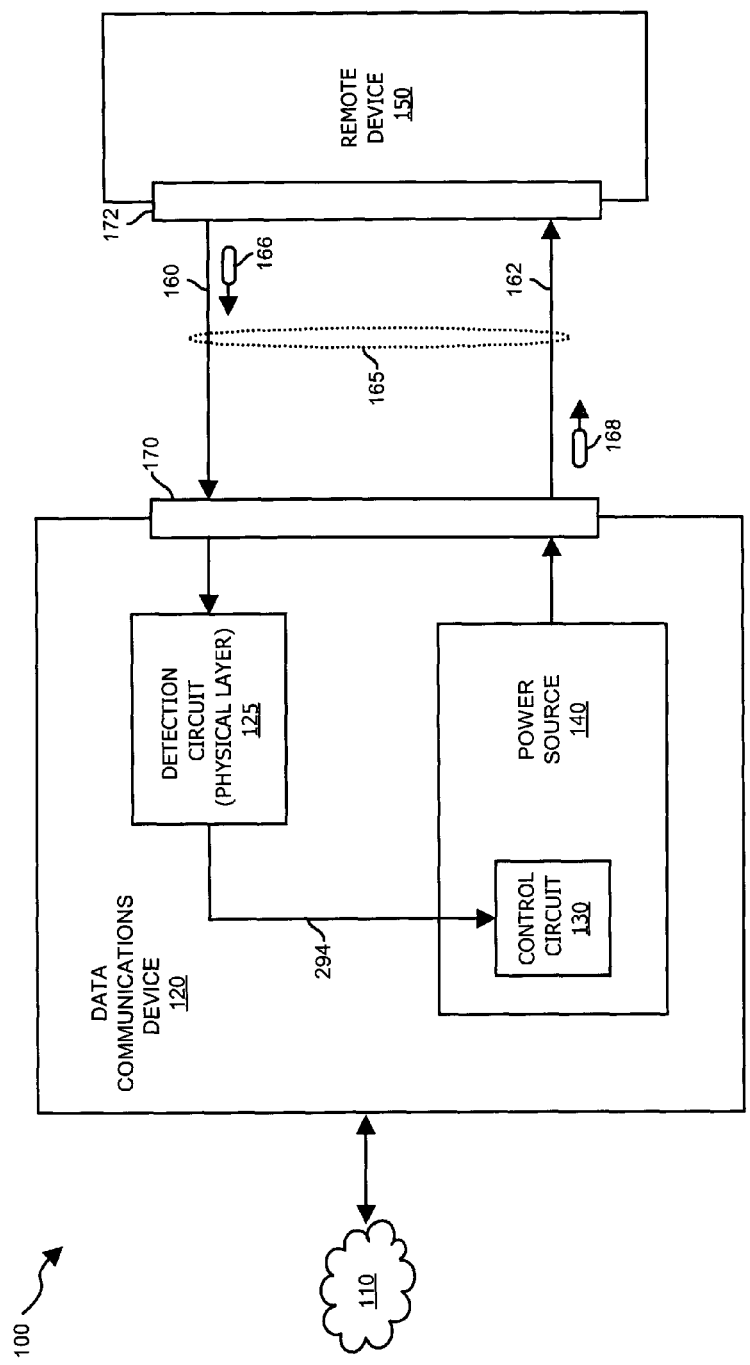
FIG. 1 is a block diagram illustrating a system for powering a remote device through a network cable.

FIG. 1 is a block diagram of communication system 100 in accordance with one embodiment of the present invention. As shown, communication system 100 includes network 110, data communications device 120, network cable 165, and remote device 150. Data communications device 120 itself includes detection circuit 125, power source 140, and associated control circuit 130.

In the context of a network application, remote device 150 such as a VOIP (Voice Over IP) telephone communicates through data communications device 120 (and network 110) over network cable 165.

Data communications device 120 such as a router, bridge, hub, switch, or other network device conditionally provides power through network cable 165 to remote device 150 depending upon whether remote device 150 is configured to receive power over network cable 165. For example, remote device 150 may be a VOIP phone that is powered via data communications device 120 or a laptop computer that is not powered by data communications device 120. Specific protocols are performed during initial communications to determine whether remote device 150 shall be powered through network cable 165.

Medium 160 such as a twisted pair of wires in network cable 165 supports data transmission from remote device 150 to data communications device 120. In a reverse direction, medium 162 such as a pair of twisted wires supports data transmission from data communications device 120 to remote device 150. Messages 166, 168 transmitted between data communications device 120 and remote device 150 include one or multiple data packets such as those encoded according to an Ethernet protocol, or other layered network protocol. It should be noted that network cable 165 may include additional conductors (such as twisted pairs of wire) to support other functions.

Data communications device 120 includes detection circuit 125 that monitors messages 166 received over medium 160 at a physical layer associated with a networked layer protocol supporting messages 166, 168. To identify whether remote device 150 is coupled to data communications device 120 via network cable 165, detection circuit 125 monitors medium 160 for logical voltage transitions such as a time-varying signal associated with messages 166. Voltage transitions are underlying boundary of block messages or communications.

Initial communications (e.g., negotiation of hardware and software capability) between remote device 150 and data communications device 120 reveal whether it is acceptable for data communications device 120 and, more specifically, power source 140 to provide power through network cable 165. Powering remote device 150 through network cable 165 alleviates a user from having to plug remote device 150 into, e.g., a wall outlet or battery pack.

As previously discussed, detection circuit 120 monitors voltage transitions associated with message 166 (such as a mere 'heartbeat' signal or idle or data itself including at least occasional logical state transitions) from remote device 150. In one application, voltage transitions such as sequences of logic ones and zeros DC-balance (approximate equal number of logic ones and zeros) on medium 160 so that no excess charge builds up on network cable 165.

If detection circuit 125 monitoring a received signal at a physical layer fails to sense voltage transitions on medium 160, it is presumed that remote device 150 (and more specifically connector 172) has been disconnected from network cable 165. In response to detecting that remote device 150 has been unplugged, detection circuit 125 generates signal 294 to control circuit 130 indicating the 'unplugged' condition. Based on the "unplugged" condition, control circuit 130 in turn terminates power to remote device 150 provided by power source 140 through network cable 165. More particular details regarding hardware to control power through network cable 165 is shown in FIG. 2.

According to one arrangement as discussed, network cable 165 supports communications based on a layered network protocol such as Ethernet. In this arrangement, detection circuit 125 detects when remote device 150 has been disconnected from network cable 165 by failing to sense logical state transitions in the hardware-level signal (or link energy) from remote device 150. This technique of monitoring a received signal (or messages 166, or link energy) at a physical layer enables data communications device 120 providing power to detect when remote device 150 has been disconnected from network cable 165 prior to sensing or flagging the disconnection at a link layer. Consequently, power through network cable 165 can be terminated on the order of milliseconds instead of 1.5 seconds or more according to conventional methods. It is potentially disadvantageous to speed up a link-down state machine to shorten this time because it would have the effect of creating excess overhead (for creating links) in the event of transient communication outages.

Figure 2:
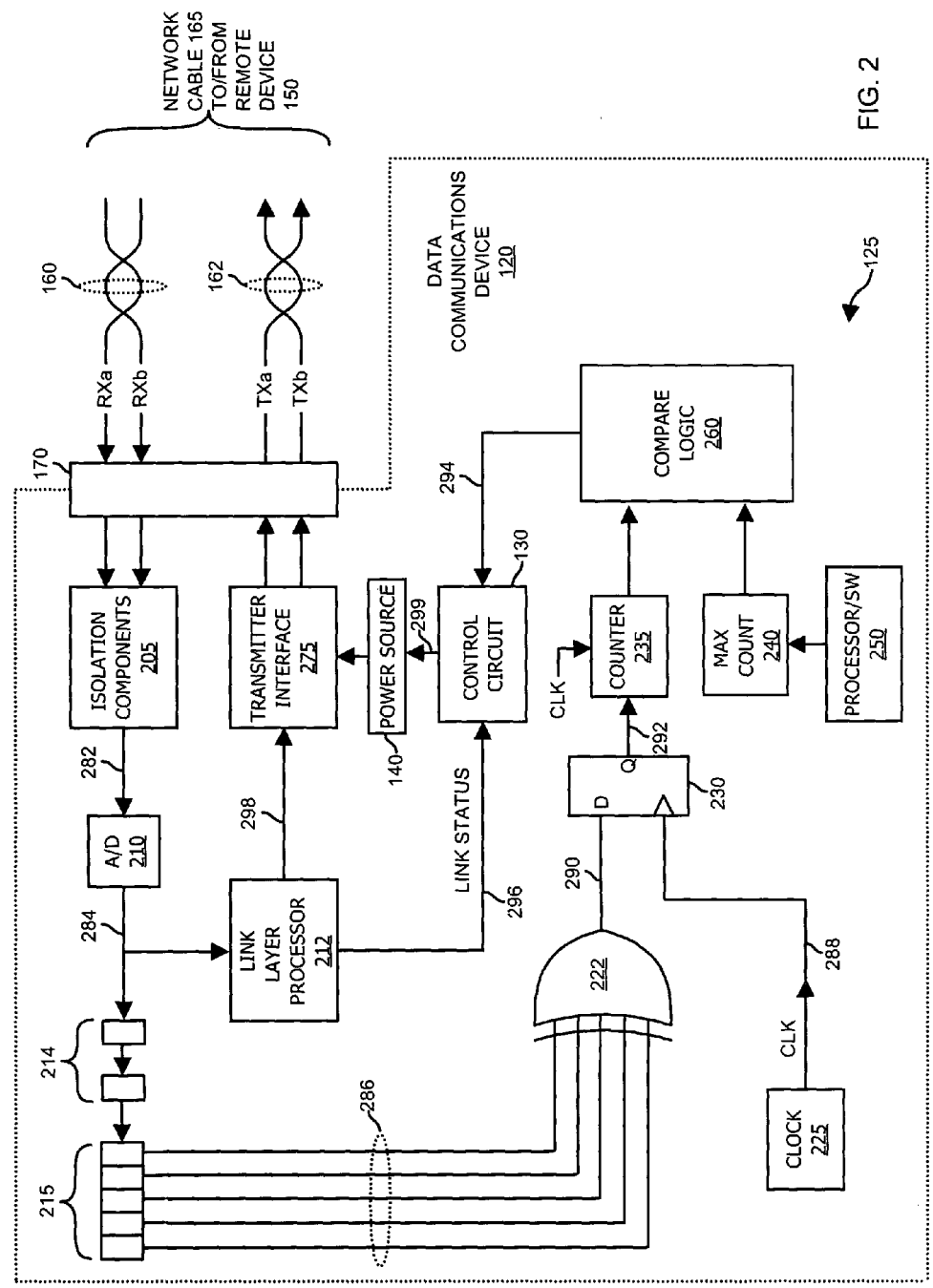
FIG. 2 is a detailed block diagram illustrating components of a power controller that controls power supplied through a network cable to a remote device.

FIG. 2 is a detailed block diagram of detection circuit 125 associated with data communications device 120. As shown, data communications device 120 includes connector 170, isolation components 205, A/D (Analog-to-Digital) converter 210, two-stage synchronizer circuit 214, tapped shift register 215, logic circuit 222, clock 225, flip-flop 230, counter 235, max count 240, processor 250 (including software instructions), compare logic 260, control circuit 130, power source 140, transmitter interface 275, and link layer processor 212.

As mentioned, one purpose of detection circuit 125 is to monitor whether remote device 150 is plugged into network cable 165. In operation, isolation components 205 (such as a transformer and related circuitry) receives messages 166 over medium 160 of network cable 165 from remote device 150. In response to a presence of voltage transitions (or link energy) on medium 160, isolation components 205 generates (time-varying) voltage signal 282. A/D converter 210 converts (time varying) voltage signal 282 into digital signal 284, which in turn feeds into link layer processor 212 and two-stage synchronizer 214.

Link layer processor 212 processes messages 166 received from remote device 150 and additionally communicates information (such as reply messages 168) via signal 298 through transmitter interface 275 over medium 162 of network cable 165 to remote device 150. As previously discussed, data communications device 120 and remote device 150 initially execute a series of 'discovery' protocols to establish a connection at a link layer to communicate via a network layered protocol.

In addition to receiving digital signal 284 at link layer processor 212, two-stage synchronizer circuit 214 (such as shift registers) and, thereafter, tapped shift register 215 receive digital signal 284 generated by A/D converter 210. Bit information associated with digital signal 284 (and, more specifically, messages 160) are clocked through two-stage synchronizer 214 into tapped shift register 215 depending on a rate of receiving data over medium 160. For example, communications associated with communication system 100 may be supported by Ethernet ports operating at 10/100/1000 megabits per second. Bits are clocked into tapped shift register 215 depending on a rate of communicating bit information over network cable 165.

In one application, bit information is "coded up" (using techniques such as 4B/5B encoding) when transmitted by remote device 150. For example, remote device 150 encodes a string of raw data bits such as 0000 binary as 11000 binary to ensure there is always a voltage transition on medium 160 during communications with data communications device 120. This type of "coding-up" may ensure that unwanted DC voltages do not build up over time on the network cable 165. Continuous voltage transitions in digital signal 284 indicate that data communications device 120 is coupled with remote device 150. In comparison, when remote device 150 is unplugged from network cable 165, digital signal 284 is a continuous logic high or low.

Tapped shift register 215 (or n-bit shift register) stores strings of received bit information from digital signal 284. Logic circuit 222 such as a 5-input XOR gate receives tapped bit information 286 generated by tapped shift register 215. Output (signal 290) of logic circuit 222 feeds into flip-flop 230 and indicates whether or not voltage transitions are present on digital signal 284 (and thus signal 282) during a window of time such as the time it takes to shift 5 bits though shift register 215. When a signal (such as message 166) is received over network cable 165 from remote device 150, the output (signal 290) from logic circuit 222 is typically set to a logic 'one' as a result of the 4B/5B encoding scheme as previously discussed. For example, at least one of the five bits (of tapped shift register 215) will be set to an opposite logic state than the other four bits when data communications device 120 detects a valid signal (link energy) received from remote device 150. Detecting transitions causes signal 290 to be set to a logic high indicating that voltage transitions are detected in signal 282 and that remote device 150 is plugged into network cable 165.

In lieu of "coding up" using 4B/5B encoding (or other DC-balance coding) as discussed above, a protocol for communicating on network cable 165 may include a preamble such as a toggling series of logic ones and zeros. Since messages include a known sequence of toggling one and zeros, an unplugged network cable 165 can be identified when preamble transitions are no longer detected.

Signal 290 feeds into input D of flip-flop 230. Clock 225 generates clock signal 288 to periodically sample signal 290 at the appropriate time. Output Q of flip-flop 230 generates counter reset signal 292, which is an active high signal. For example, when counter reset signal 292 is a logic high, flip-flop 230 resets counter 235 (such as a 16-bit counter) so that it does not increment and is forced to a count of 0000 hex. In the event that voltage transitions are no longer detected in digital signal 284, tapped shift register 215 becomes filled with either all ones or all zeros. This condition in which there are no voltage transitions on signal 282 (or message 166 from remote device 150) causes counter reset signal 292 to be set logic low, enabling counter 235 to increment according to applied clock signal 288.

Compare logic 260 compares max count 240 with a value of counter 235. If and when a value of counter 235 equals or exceeds max count 240, compare logic sets compare result signal 294 to a logic high level indicating that data communications device 120 does not receive a signal from remote device 150 within a specified duration or period of time (such as a timeout window). Conversely, when a value of counter 235 is less than max count 240, compare logic 260 sets compare result signal 294 to a logic low indicating that data communications device 120 presently (or recently) detects (or detected) voltage transitions from digital signal 284 received from remote device 150.

In one application, max count 240 is programmable. In such an application, processor 250 programs max count 240 to be a predetermined value depending how long voltage transitions on digital signal 284 must cease before a timeout (e.g., terminate power through network cable 165 to power remote device 150) occurs.

During operation, tapped shift register 215 may temporarily fill with a sequence of all ones or zeros (such as a transient communication failure) indicating lack of a received (time-varying) signal 282 from remote device 150. This condition will cause counter 235 to increment. However, if tapped shift register 215 becomes filled with a bit sequence indicating that voltage transitions are again detected, counter reset signal 292 is driven to a logic high again and resets counter 235 to 0000 binary so that it is less than max count 240. Accordingly, compare result 294 does not indicate transient link outages as long as counter 235 does not exceed a value of max count 240 in the course of incrementing. Longer communication outages are presumed to be caused by a user unplugging remote device 150 from network cable 165 and do cause compare result 294 to indicate that a timeout has occurred since counter 235 increments to a value greater than max count 240.

Providing a programmable max count 240 (or clock associated with counter 235) increases system flexibility because the predetermined interval of time can be programmed so that the time between detecting that remote device 150 has been unplugged from network cable 165 and terminating power supplied through network cable 165 varies depending on the application. For example, the predetermined interval of time (or timeout value) can be selected or programmed so that power through network cable 165 is terminated between, e.g., 1 millisecond and 1 second (or more), after detecting no voltage transitions on digital signal 284. Typically, the predetermined time interval (or value controlled by setting max count 240) is short enough so that a user unplugging network cable 165 from remote device 150 (such as a VOIP phone) cannot then plug network cable 165 into another device (such as a laptop computer) prior to termination of power supplied through network cable 165. Thus, immediately plugging network cable 165 into a laptop computer after unplugging it from another previously powered remote device 150 (as fast as humanly possible) poses no danger to the laptop computer.

Compare result 294 feeds into control circuit 130. Depending on a state of compare result 294, control circuit 130 generates power control signal 299 to control whether power source 140 supplies power over network cable 165 to remote device 150. For example, when counter 235 exceeds max count 240, it is presumed that remote device 150 has been unplugged from network cable 165 because voltage transitions are no longer detected in digital signal 284 within a selected window of time. In response to this "unplugged" condition and after counter 235 exceeds max count 240, data communications device 120 (and more specifically power source 140) thereafter no longer provides power to remote device 150 through network cable 165.

One type of device typically not requiring power from data communications device 120 is a laptop computer having its own battery pack. Thus, if a user completes a call using remote device 150 such as a VOIP phone powered through network cable 165 and quickly plugs network cable 165 into the laptop computer, the laptop computer (or associated network interface card of the laptop computer) is not in any danger because data communications device 120 terminates power soon after the VOIP phone was disconnected. Thus, the user does not to worry about the possibility of causing damage by unplugging network cable 165 from remote device 150 and plugging it into another remote device 150. Moreover, there is no need for a visual indication when it is safe to plug the cable into another remote device 150 after previously using network cable 165 in another application.

Figure 3:
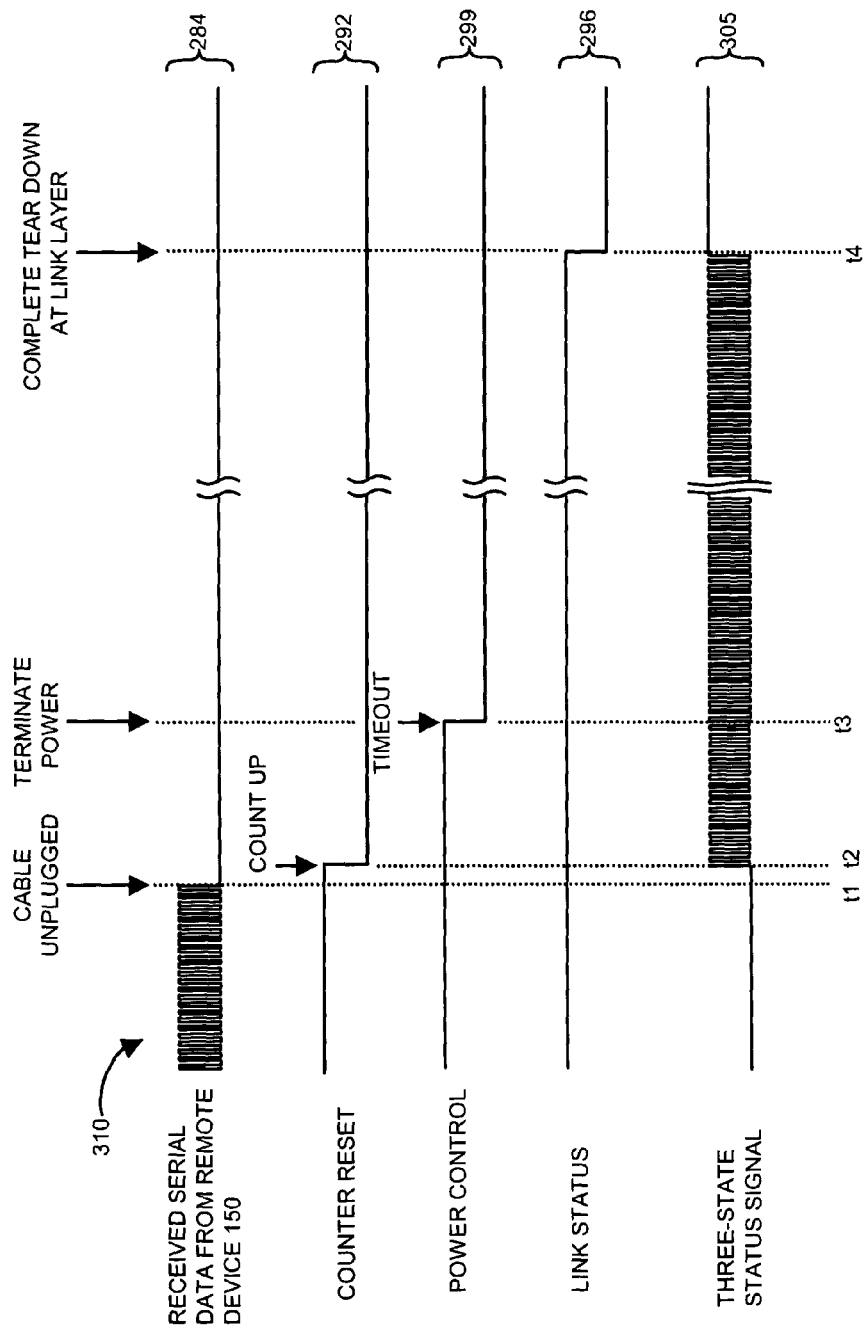
FIG. 3 is a timing diagram illustrating various events associated with terminating power delivered through a network cable to a remote device.

FIG. 3 is a timing diagram illustrating how power is terminated in response to detecting that network cable 165 has been unplugged from remote device 150 (or that communications have ceased). As shown in the timing diagram, network cable 165 becomes unplugged from remote device 150 at time t1. Prior to time t1, digital signal 284 includes voltage transitions 310 that force counter 235 into a reset mode (potentially via a reset pulse) so that it does not increment as previously discussed. For example, counter reset signal 292 is set logic high. At time t2, counter reset signal 292 goes low as a result of failing to sense voltage transitions in digital signal 284. Thus, at time t2 and thereafter, counter 235 begins incrementing at a clock rate provided by clock 225 (or derivative clock rate) such as a 1 MHz (MegaHertz) clock.

At time t3, counter 235 has incremented so that it equals max count 240. In response to this condition, compare logic 260 sets compare result signal 294 to a logic high indicating that a timeout has occurred. In other words, no voltage transitions 310 were detected between time period t1 and t3. Consequently, power control signal 299 is set to a logic low level to terminate power supplied by power source 140 through network cable 165. Notably, link status signal 296 remains (for some time) a logic high up until time t4 at which point link layer processor 298 identifies that link has been terminated. According to a conventional method, the time between t1 and t4 is up to 1.5 seconds. Note that according to one aspect of the present invention, power through one aspect network cable 165 is terminated prior at time t3, which is in advance of tearing down a link layer a time t4.

Power control signal 299 and link status signal 296 are optionally combined to produce three-state status signal 305 from control circuit 130. Three-state status signal 305 is logic low (prior to time t2) to indicate that a link layer had been established between data communications device 120 and remote device 150. When the link is established, power source 140 supplies power through network cable 165 to remote device 150.

Between time t2 and t4 three-status signal 305 toggles at, e.g., 1 MHZ, 50% duty cycle to indicate that no voltage transitions 310 have been detected. In this state, link status signal 296 still indicates that a link layer is still established at a time between t2 and t4 even though no voltage transitions 310 are being detected. Three-state status signal 305 can be used to drive an LED that appears ON when in a 1-MHz toggling mode.

Finally, three-state status signal 305 is logic high (after time t4) to indicate that a link between data communications device 120 and remote device 150 has been terminated at a link layer and that power source 140 no longer supplies power through network cable 165. As mentioned, combining status information into three-state status signal 305 reduces an overall pin count of a component generating such a signal.

Figure 4:
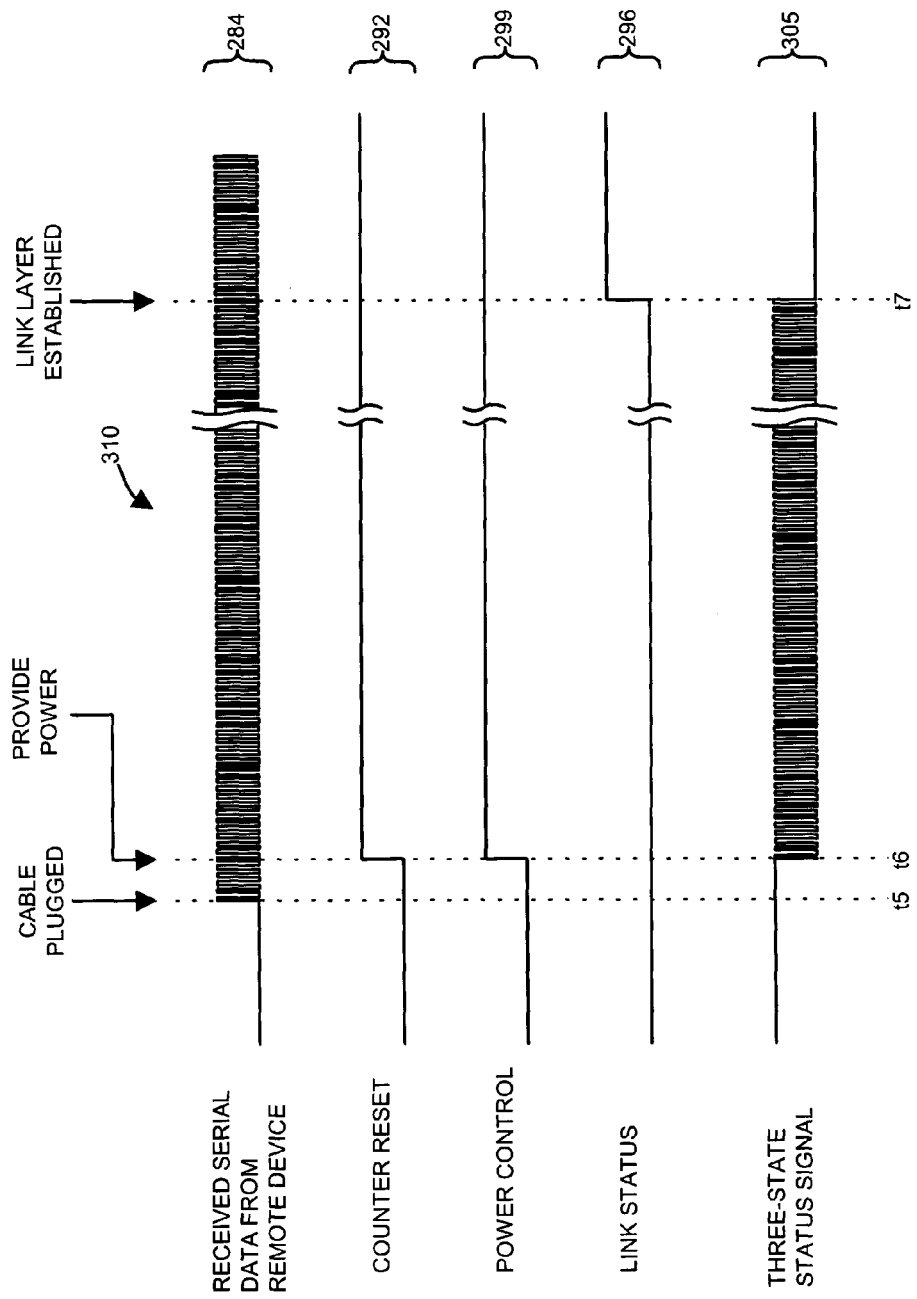
FIG. 4 is a timing diagram illustrating various events associated with providing power through a network cable to power a remote device.

FIG. 4 is a timing diagram of a power-up phase associated with communication system 100. At time t5, network cable 165 is plugged into remote device 150. Consequently, remote device 150 receives a signal from data communications device 120. In response, remote device 150 generates a data stream including voltage transitions 310. After determining (via discovery negotiations) that remote device 150 is "powerable" through network cable 165 and that there are voltage transitions 310 on digital signal 284 from remote device 150, control circuit 130 sets power control signal 299 to a logic high and supplies power through network cable 165 to power remote device 150. Link layer negotiations to set up a link between remote device 150 and data communications device 120 are completed at time t7.

According to one arrangement, control circuit 130 generates three-state status signal 305 to control power source 299. Prior to time t6, three-state status signal 305 is logic low to indicate that a link layer has not yet been completed established and that power source 140 does not provide power through network cable 165. Between t6 and t7, three-state status signal 305 is in a toggle mode (1 MHz signal, 50% duty cycle) indicating that voltage transitions 310 have been detected on digital signal 284 but a link layer has not yet been established between data communication device 120 and remote device 150. Finally, three-state status signal 305 is set to logic low after time t7 indicating that power source supplies power through network cable 165 and that a connection has been established at a link layer.

Figure 5:
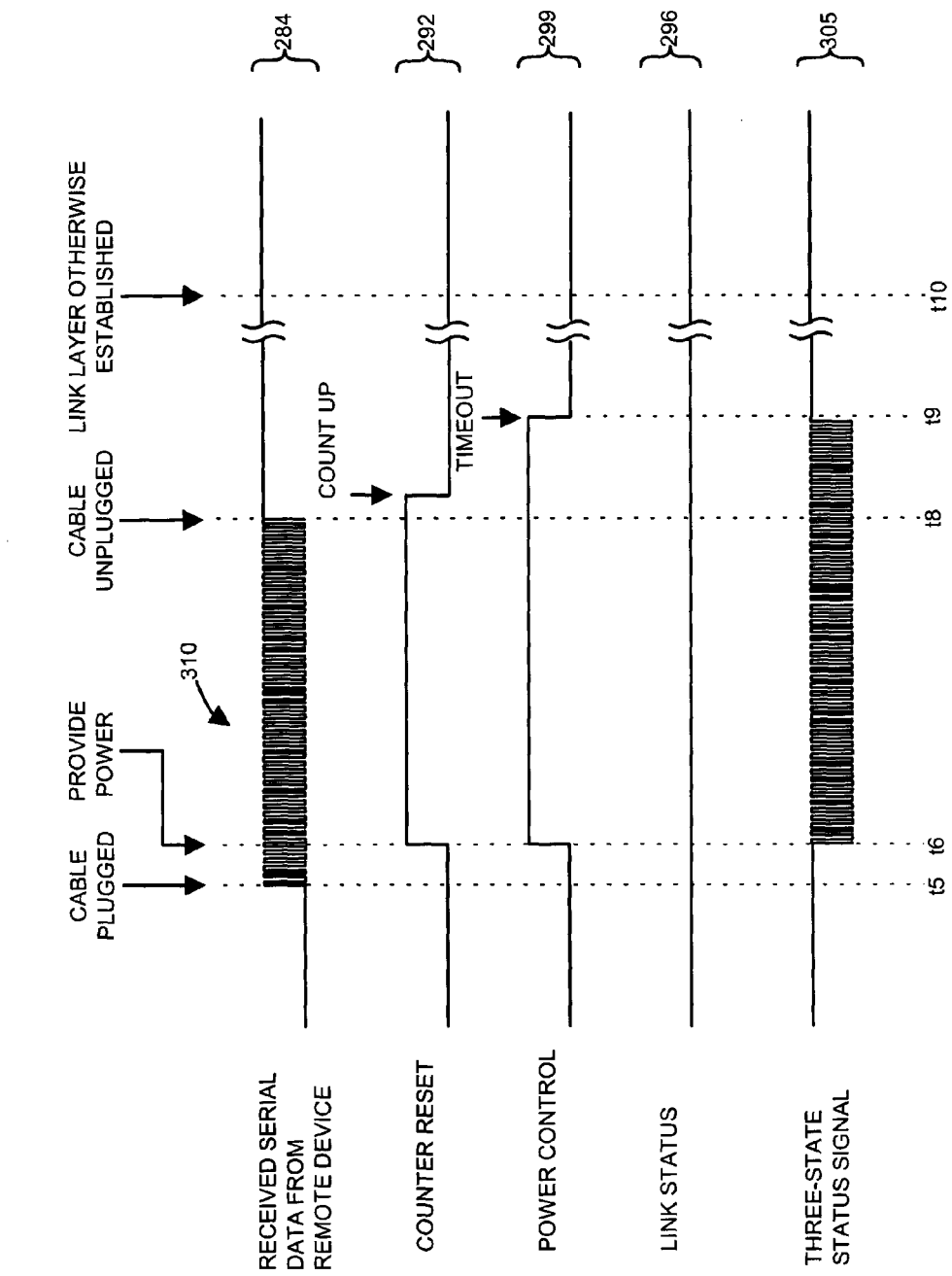
FIG. 5 is a timing diagram illustrating various events associated with terminating power provided through a network cable to power a remote device prior to establishing a link at a link layer.

FIG. 5 is a timing diagram illustrating termination of power to remote device 150 through a network cable 165 in the event that it is unplugged prior to establishing a link at a link layer. For example, at time t5, network cable 165 is plugged into remote device 150. As previously discussed, detection of voltage transitions 310 of signal 284 causes counter 235 to be reset. At time t6, data communications device 120 provides power through network cable 165 to power remote device 150. Prior to otherwise establishing a connection at a link layer at time t10 (if network cable 165 was not unplugged), network cable 165 is unplugged at time t8. Unplugging network cable 165 from remote device 150 results in a failure to detect voltage transitions 310 on signal 284. In turn, counter 235 is no longer reset by signal 292 and a timeout occurs at time t9 (e.g., counter 235 exceeds a value of max count 240 because reset signal 292 no longer resets counter 235). As a result, data communications device 120 terminates power through network cable 165 at time t9 prior to otherwise establishing a link at a link layer.

Figure 6:
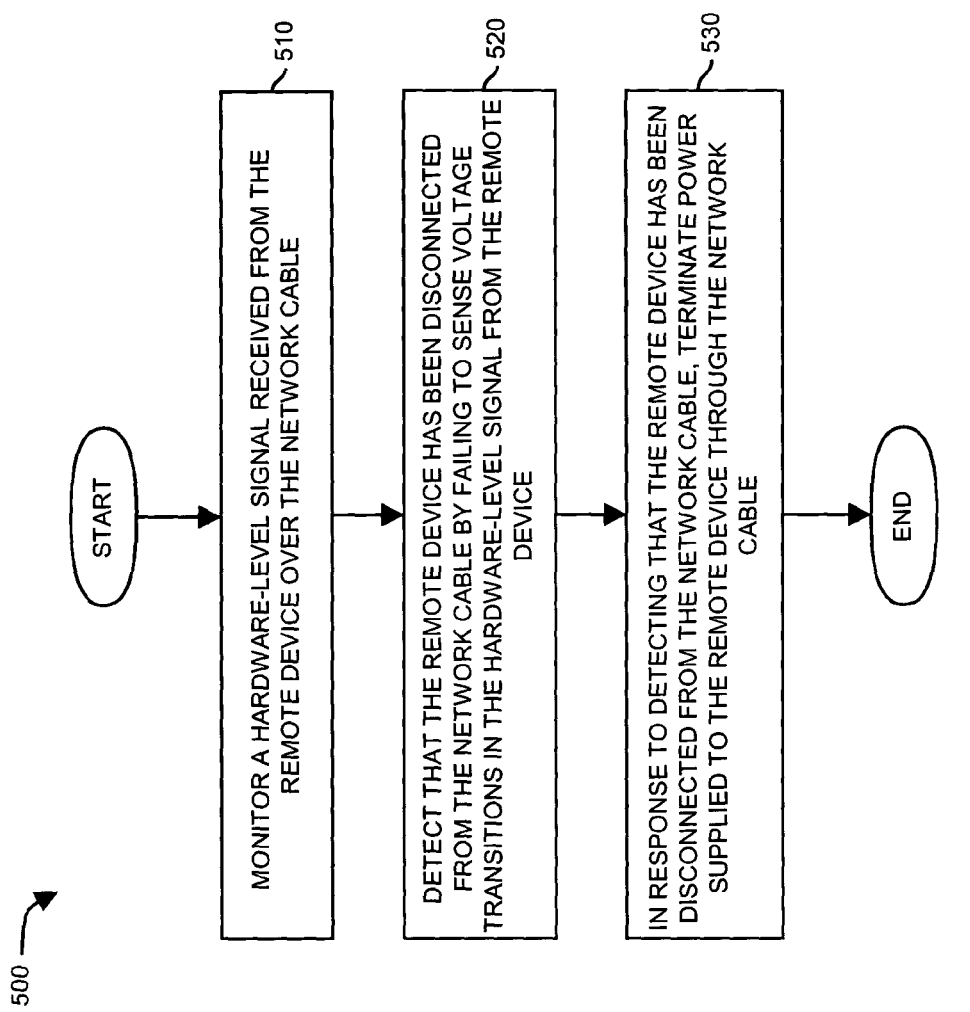
FIG. 6 is a flow chart illustrating a technique of terminating power supplied through a network cable to a remote device.

FIG. 6 is a flow chart 500 illustrating a method of terminating power according to one embodiment of the present invention.

In step 510, detection circuit 125 monitors a hardware-level signal at a physical layer (such as signal 282) received from remote device 150 over network cable 165.

In step 520, detection circuit 125 detects that remote device 150 has been disconnected from network cable 165 based on a failure of sensing voltage transitions 310 in the hardware-level signal received from remote device 150.

In step 530, data communications device 120 terminates power supplied through network cable 165 in response to detecting that remote device 150 has been disconnected from network cable 165.

In summary, techniques of the present invention reduce a time it takes to terminate power delivered through a network cable after a remote device has been unplugged. A user therefore does not need to worry about whether it is safe to plug a network cable into another device.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of terminating power supplied to a remote device through a network cable, the method comprising:
   monitoring a hardware-level signal received from the remote device over the network cable;
   detecting that the remote device has been disconnected from the network cable by failing to sense voltage transitions in the hardware-level signal received from the remote device; and
   in response to detecting that the remote device has been disconnected from the network cable, terminating power supplied through the network cable,
   wherein:
   the monitoring comprises continually monitoring the network cable for the presence of a data communications signal sent by the remote device when attached to the network cable, the communications signal being present on the network cable even when the remote device is not actively transmitting data on the network cable;
   and further comprising:
   detecting, after terminating power supplied to the remote device through the network cable, that the remote device has been re-connected to the network cable by detecting the presence of the data communications signal sent by the remote device; and
   in response to detecting that the remote device has been re-connected to the network cable, supplying power to the remote device through the network cable,
   and wherein the data communications signal is encoded according to a code such that a detectable voltage transition of the coded data communications signal is guaranteed to occur over no more than a small number of signaling intervals even when the remote device is not transmitting data.

2. The method as in claim 1, wherein the data communications signal is a binary data communications signal whose voltage transitions over respective time periods represent corresponding data packets being sent over the network cable by the remote device.

3. The method as in claim 1, wherein the network cable supports a layered network protocol and detecting that the remote device has been disconnected from the network cable includes:
   failing to sense logical state transitions in the hardware-level signal at a physical layer associated with the layered network protocol.

4. The method as in claim 3, wherein detecting that the remote device has been disconnected from the network cable includes:
   detecting that the remote device has been disconnected from the network cable at a physical layer prior to identifying a disconnection at a link layer.

5. The method as in claim 1, wherein detecting that the remote device has been disconnected from the network cable includes:
   failing to sense voltage transitions in the hardware-level signal during a predetermined interval of time.

6. The method as in claim 5 further comprising:
   programming the predetermined interval of time to be a selected value.

7. The method as in claim 1, wherein providing power to a remote device through the network cable includes:
   powering a remote device that supports Voice Over Internet Protocol (VOIP).

8. The method as in claim 1, wherein monitoring the hardware-level signal received from the remote device over the network cable includes:
   generating a three-state status signal that identifies a state of a link established with the remote device.

9. The method as in claim 8 further comprising:
   utilizing the three-state status signal to terminate power supplied to the remote device.

10. The method as in claim 1, wherein a time difference between detecting a condition in which the remote device has been disconnected from the network cable and terminating power supplied through the network cable is less than 0.8 seconds.

11. The method as in claim 1, wherein the number of signaling intervals is substantially the number of binary digits forming a code symbol of the code.

12. A system for terminating power supplied through a network cable, the system comprising:
   a power source that conditionally provides power to a remote device through the network cable;
   a detection circuit to monitor a hardware-level signal received from the remote device over the network cable, the detection circuit generating a control signal identifying when the remote device is disconnected from the network cable based on a lack of voltage transitions in the hardware-level signal received from the remote device; and
   a control circuit associated with the power source that receives the control signal and, in response to receiving the control signal indicating that the remote device has been disconnected from the network cable, terminates power supplied by the power source through the network cable,
   wherein:
   the detection circuit continually monitors the network cable for the presence of a data communications signal sent by the remote device when attached to the network cable, the communications signal being present on the network cable even when the remote device is not actively transmitting data on the network cable;
   after the control circuit has terminated power supplied through the network cable, the detection circuit detects that the remote device has been re-connected to the network cable by detecting the presence of the data communications signal sent by the remote device; and
   the control circuit responds to the detection of the re-connection of the remote device to the network cable by supplying power to the remote device through the network cable,
   wherein the data communications signal is encoded according to a code such that a detectable voltage transition of the coded data communications signal is guaranteed to occur over no more than a small number of signaling intervals even when the remote device is not transmitting data.

13. The system as in claim 12, wherein the data communications signal is a binary data communications signal whose voltage transitions over respective time periods represent corresponding data packets being sent over the network cable by the remote device.

14. The system as in claim 12, wherein the network cable supports a layered network protocol and the detection circuit monitors voltage transitions of the hardware-level signal at a physical layer associated with the layered network protocol.

15. The system as in claim 12, wherein the detection circuit generates a control signal identifying that the remote device is disconnected from the network cable based on lack of sensing voltage transitions during a predetermined interval of time.

16. The system as in claim 15 further comprising:
   a memory device to store a binary value corresponding to the predetermined interval of time; and
   a processor device that programs the memory device with the binary value corresponding to the predetermined interval of time.

17. The system as in claim 12, wherein a time difference between detecting that the remote device has been disconnected from the network cable and terminating power supplied through the network cable is less than 1 second.

18. The system as in claim 12, wherein the remote device supports Voice Over Internet Protocol (VOIP).

19. The system as in claim 12, wherein monitoring the detection circuit generates a three-state status signal that identifies a state of the hardware-level signal from the remote device.

20. The system as in claim 19, wherein the control circuit associated with the power source terminate power supplied to the remote device based on the three-state status signal.

21. The method as in claim 12, wherein the number of signaling intervals is substantially the number of binary digits forming a code symbol of the code.

* * * * *